United States Patent
Dehlinger et al.

(10) Patent No.: US 11,294,058 B2
(45) Date of Patent: Apr. 5, 2022

(54) MOTION CORRECTION BASED ON PHASE VECTOR COMPONENTS

(71) Applicant: Sense Photonics, Inc., Durham, NC (US)

(72) Inventors: Dietrich Dehlinger, San Francisco, CA (US); Hod Finkelstein, Berkeley, CA (US)

(*) Notice: Subject to any disclaimer, the term of this patent is extended or adjusted under 35 U.S.C. 154(b) by 0 days.

(21) Appl. No.: 17/257,433

(22) PCT Filed: Apr. 8, 2020

(86) PCT No.: PCT/US2020/027138
§ 371 (c)(1),
(2) Date: Dec. 31, 2020

(87) PCT Pub. No.: WO2020/210276
PCT Pub. Date: Oct. 15, 2020

(65) Prior Publication Data
US 2021/0231805 A1    Jul. 29, 2021

Related U.S. Application Data (60) Provisional application No. 62/830,898, filed on Apr. 8, 2019.

(51) Int. Cl.
*G01S 17/58* (2006.01)
*G01S 17/10* (2020.01)

(52) U.S. Cl.
CPC ............. *G01S 17/58* (2013.01); *G01S 17/10* (2013.01)

(58) Field of Classification Search
None
See application file for complete search history.

(56) References Cited

U.S. PATENT DOCUMENTS

| | | | |
|---|---|---|---|
| 5,745,437 A * | 4/1998 | Wachter | G01S 17/10 |
| | | | 342/127 |
| 2013/0044309 A1* | 2/2013 | Dakin | G01S 7/4814 |
| | | | 356/4.09 |
| 2017/0041589 A1 | 2/2017 | Patil et al. | |
| | (Continued) | | |

FOREIGN PATENT DOCUMENTS

WO    2020037167 A1    2/2020

OTHER PUBLICATIONS

Hourad, Radu "A Short Tutorial on Three-Dimensional Cameras" INRIA Grenoble Rhone-Alpes (44 pages) (Apr. 2013).
(Continued)

*Primary Examiner* — Hovhannes Baghdasaryan
(74) *Attorney, Agent, or Firm* — Myers Bigel, P.A.

(57) ABSTRACT

A flash LIDAR apparatus includes emitter units configured to emit optical signals over a field of view, and detector pixels configured to output detection signals responsive to light representing the optical signals incident thereon. The detection signals correspond to respective phase offsets relative to a frequency of the optical signals. A circuit is configured to determine component measurements corresponding to the respective phase offsets from the detection signals, and calculate a distance of a target from which the light was reflected based on the detection signals. The distance is corrected for motion of the target based on subsets of the component measurements.

22 Claims, 4 Drawing Sheets

(56) References Cited

U.S. PATENT DOCUMENTS

| | | |
|---|---|---|
| 2018/0128919 A1 | 5/2018 | Ichikawa et al. |
| 2018/0210070 A1 | 7/2018 | Bleyer et al. |
| 2018/0246189 A1 | 8/2018 | Smits |
| 2018/0301872 A1 | 10/2018 | Burroughs et al. |
| 2020/0057151 A1 | 2/2020 | Finkelstein et al. |

OTHER PUBLICATIONS

Notification of Transmittal of the International Search Report and the Written Opinion of the International Searching Authority, or the Declaration, in corresponding PCT Application No. PCT/US2020/027138 (dated Aug. 11, 2019).

* cited by examiner

FIG. 5 ure to determine respective dwell times of the target at the one or more of the detector pixels, and the distance of the target may be corrected for the motion of the target based on the respective dwell times.

MOTION CORRECTION BASED ON PHASE VECTOR COMPONENTS

CLAIM OF PRIORITY

This application is a 35 U.S.C. 371 national stage application of PCT International Application No. PCT/US2020/027138, filed on Apr. 8, 2020, which claims the benefit of priority from U.S. Provisional Patent Application No. 62/830,898, filed Apr. 8, 2019, in the United States Patent and Trademark Office, the disclosures of which are incorporated by reference herein in their entireties.

FIELD

The present disclosure is directed to lidar systems, and more particularly, to time-of-flight lidar systems.

BACKGROUND

Time of flight (ToF) based imaging is used in a number of applications including range finding, depth profiling, and 3D imaging (e.g., Light Detection And Ranging (LIDAR), also referred to herein as lidar). ToF 3D imaging systems can be categorized as indirect ToF (iToF) or direct ToF systems.

Direct ToF measurement includes directly measuring the length of time between emission of radiation by emitter element(s) of a LIDAR system, and sensing the radiation after reflection from an object or other target (also referred to herein as an echo signal) by detector element(s) of the LIDAR system. From this length of time, the distance to the target can be determined.

Indirect ToF measurement includes modulating the amplitude of the signals emitted by the emitter element(s) and measuring phases (e.g., with respect to delay or shift) of the echo signals received at the detector element(s). These phases may be measured with a series of separate measurements or samples. The results of these measurements produce multiple (e.g., two) vector components, the angle formed by these components is the phase angle. The range or distance d to the target can be calculated from the detected phase shift of the returning echo signal:

$$d = \frac{ct\_}{2} \frac{\varphi}{2\pi} \frac{c}{2f_m}$$

where c is the speed of light, t is the time required for a photon to travel to the target and back to the detector, phi ($\varphi$) is the phase shift of the modulated signal and $f_m$ is the modulation frequency of the emitted signal, also referred to herein as the frequency of operation or operating frequency of the emitter.

Since the maximum phase is $2\pi$, the unambiguous range UR=c/2 $f_m$ for the frequency $f_m$ of operation. The unambiguous range may refer to the range beyond which the phase to distance mapping "wraps around" for an iToF system, such that targets therebeyond may be reported as having a shorter range than their real or actual range, where phase_reported=phase_real mod ($2\pi$). For example, due to the repeated pulsed nature of the light, an unambiguous range of 10 meters (m) may result in a 2 m measurement for an object whose actual distance is 12 m. Multi-frequency techniques may be used to resolve phase wrap around, based on light emission at different modulation frequencies such that a matching reported range for the different modulation frequencies indicates the actual range.

SUMMARY

Some embodiments described herein provide methods, systems, and devices including electronic circuits that provide a LIDAR system including one or more emitter units (including one or more semiconductor lasers, such as surface- or edge-emitting laser diodes; generally referred to herein as emitter elements or emitters, which output emitter signals) and/or one or more light detector pixels (including one or more semiconductor photodetectors, such as photodiodes, including avalanche photodiodes and single-photon avalanche detectors; generally referred to herein as detector elements or detectors, which output detection signals in response to incident light). A control circuit may be coupled to the one or more emitter elements and/or to the one or more detector elements to coordinate emission of optical signals from the emitter element(s) and activation of the detector element(s) to output detection signals responsive to light comprising the optical signals incident thereon.

According to some embodiments of the present disclosure, a LIDAR apparatus includes one or more detector pixels configured to output detection signals responsive to optical signals incident thereon over a field of view. The detection signals correspond to respective phase offsets, for example, based on a frequency of the optical signals. A circuit is configured to determine component measurements corresponding to the respective phase offsets from the detection signals, and compute an estimated velocity of a target from which the optical signals were reflected based on subsets of the component measurements.

In some embodiments, the circuit may be further configured to calculate a distance of the target based on the detection signals, wherein the distance of the target is corrected for motion of the target based on the estimated velocity.

In some embodiments, the circuit may be configured to calculate intermediate phase vectors from the component measurements of the subsets, and to compute the estimated velocity of the target based on changes in vector phase indicated by the intermediate phase vectors In some embodiments, the circuit may be configured to calculate the intermediate phase vectors from respective vector sums of the component measurements of the subsets. In some embodiments, the intermediate phase vectors may include two or three intermediate phase vectors. In some embodiments, consecutive or sequential ones of the respective phase offsets may be separated by about 90 degrees.

In some embodiments, the component measurements of each of the subsets may correspond to consecutive subframes of operation of the one or more detector pixels. Each of the subframes comprising the detection signals corresponding to one of the respective phase offsets. That is, the detection signals corresponding to the respective phase offsets may define respective subframes of a measurement frame of operation of the one or more detector pixels.

In some embodiments, the subsets from which the estimated velocity is computed collectively define a frame of operation of the one or more detector pixels, where the frame includes the consecutive subframes.

In some embodiments, the circuit may be further configured to determine respective dwell times of the target at the one or more of the detector pixels, and the distance of the target may be corrected for the motion of the target based on the respective dwell times.

In some embodiments, the circuit may be configured to apply phase correction to the component measurements of the detection signals output from the one or more of the detector pixels and/or to the estimated velocity based on the respective dwell times.

In some embodiments, the circuit may be configured to determine the respective dwell times based on signals received from an image sensor camera comprising pixel elements that are arranged and operated with spatial and temporal correspondence to the one or more detector pixels relative to the field of view.

In some embodiments, the circuit may be configured to determine the respective dwell times based on identification of portions of the target at the one or more of the detector pixels. The identification may be based on subsets of the signals from the image sensor camera corresponding to consecutive images.

In some embodiments, the circuit may be configured to determine the respective dwell times based on intensity information from the detection signals output from the one or more of the detector pixels.

In some embodiments, the detection signals may be output based on respective measurement frequencies and/or acquisition integration times. The circuit may be configured to compute the estimated velocity based on respective distances indicated by the subsets of the component measurements corresponding to the respective measurement frequencies and/or acquisition integration times.

In some embodiments, the respective phase offsets may correspond to portions of the respective measurement frequencies.

In some embodiments, identifying the distance of the target may be based on a correspondence of respective distances indicated by detection signals corresponding to two or more of the respective measurement frequencies. In some embodiments, the correspondence may be indicated by a lookup table that correlates respective phase shift pairs to respective subranges of an unambiguous range for the respective measurement frequencies.

In some embodiments, the LIDAR apparatus is a flash LIDAR apparatus, and the one or more detector pixels may include a plurality of detector pixels defining a detector array.

According to some embodiments of the present disclosure, a method of operating a LIDAR apparatus includes performing operations by at least one processor. The operations include receiving, from one or more detector pixels, detection signals responsive to optical signals incident thereon over a field of view, the detection signals corresponding to respective phase offsets; determining component measurements corresponding to the respective phase offsets from the detection signals; and computing an estimated velocity of a target from which the optical signals were reflected based on subsets of the component measurements.

In some embodiments, the operations further include calculating a distance of the target based on the detection signals. The distance of the target may be corrected for motion of the target based on the estimated velocity.

In some embodiments, computing the estimated velocity may include calculating intermediate phase vectors from the component measurements of the subsets; and computing the estimated velocity based on changes in phase indicated by the intermediate phase vectors.

In some embodiments, the component measurements of each of the subsets may correspond to consecutive subframes of operation of the one or more detector pixels.

In some embodiments, the subsets from which the estimated velocity is computed may collectively define a frame of operation of the one or more detector pixels. The frame may include the consecutive subframes.

In some embodiments, the operations may further include determining respective dwell times of the target at the one or more of the detector pixels. The distance of the target may be corrected for the motion of the target based on the respective dwell times.

According to some embodiments of the present disclosure, a flash LIDAR apparatus includes emitter units configured to emit optical signals over a field of view, and detector pixels configured to output detection signals responsive to light representing the optical signals incident thereon. The detection signals correspond to respective phase offsets for example, based on a frequency of the optical signals. A circuit is configured to determine component measurements corresponding to the respective phase offsets from the detection signals, and calculate a distance of a target from which the light was reflected based on the detection signals. The distance is corrected for motion of the target based on subsets of the component measurements.

In some embodiments, the circuit may be further configured to compute an estimated velocity of the target based on the subsets of the component measurements, and the distance of the target may be corrected for the motion of the target based on the estimated velocity.

In some embodiments, the circuit may be configured to calculate intermediate phase vectors from the component measurements of the subsets, and to compute the estimated velocity of the target based on the intermediate phase vectors.

In some embodiments, the component measurements of each of the subsets may correspond to consecutive subframes of operation of the detector pixels. Each of the subframes may include the detection signals corresponding to one of the respective phase offsets.

In some embodiments, the subsets from which the estimated velocity is computed may collectively define a frame of operation of the detector pixels comprising the consecutive subframes.

In some embodiments, the circuit may be further configured to determine respective dwell times of the target at one or more of the detector pixels, and the distance of the target may be corrected for the motion of the target based on the respective dwell times.

In some embodiments, the circuit may be configured to determine the respective dwell times based on signals received from an image sensor camera comprising pixels that are arranged and operated with spatial and temporal correspondence to the one or more detector pixels relative to the field of view.

In some embodiments, the circuit may be configured to determine the respective dwell times based on intensity information from the detection signals output from the one or more of the detector pixels.

In some embodiments, the LIDAR apparatus may be configured to be coupled to a vehicle such that the detector pixels are oriented relative to an intended direction of travel of the vehicle.

Other devices, apparatus, and/or methods according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

DETAILED DESCRIPTION OF EMBODIMENTS

In the following detailed description, numerous specific details are set forth to provide a thorough understanding of embodiments of the present disclosure. However, it will be understood by those skilled in the art that the present disclosure may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

Embodiments of the present disclosure are described herein with reference to lidar applications and systems. A lidar system may include an array of emitters and an array of detectors, or a system having a single emitter and an array of detectors, or a system having an array of emitters and a single detector. As described herein, one or more emitters may define an emitter unit, and one or more detectors may define a detector pixel. A detector pixel may also include or provide outputs to dedicated circuits, such as storage and logic circuits, which are not shared with other pixels, referred to herein as an "in-pixel" configuration. A flash lidar system may acquire images by emitting light from an array of emitters, or a subset of the array, for short durations (pulses) over a field of view (FoV) or scene, and detecting the echo signals reflected from one or more targets in the FoV at one or more detectors. A non-flash or scanning lidar system may generate image frames by raster scanning light emission (continuously) over a field of view or scene, for example, using a point scan or line scan to emit the necessary power per point and sequentially scan to reconstruct the full FoV.

In some embodiments, the sensing of the reflected radiation may be performed using a detector array of single-photon detectors, such as a Single Photon Avalanche Diode (SPAD) detector array. SPAD detector arrays may be used as solid-state detectors in imaging applications where high sensitivity and timing resolution are desired.

Figure 1:
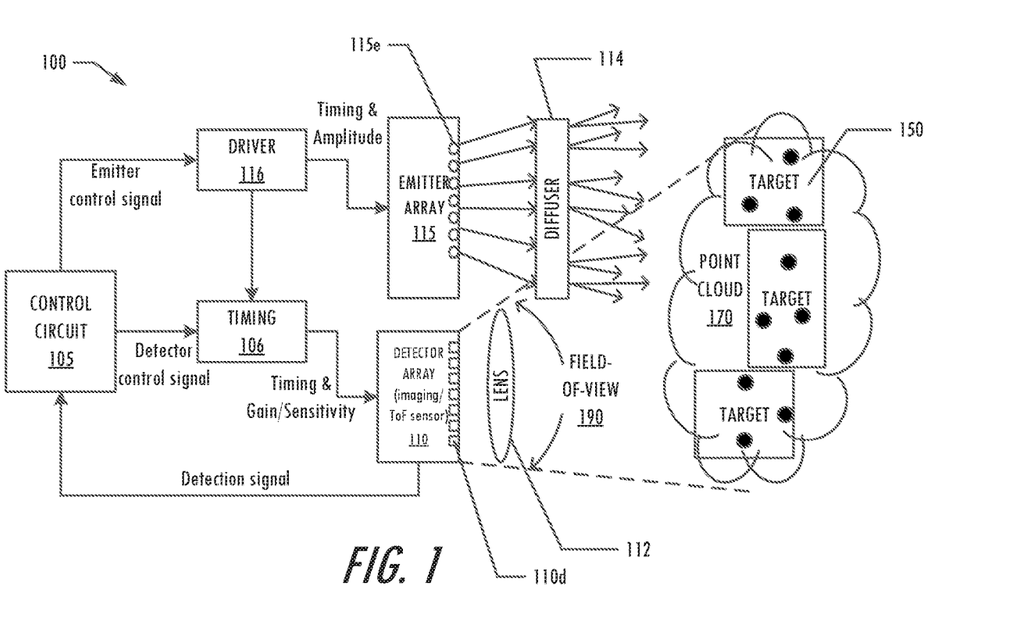
FIG. 1 is a block diagram illustrating a flash LIDAR system or circuit that is configured to calculate a distance or range that is corrected for motion of a target in accordance with some embodiments of the present disclosure.

FIG. 1 illustrates some components of a ToF measurement system or circuit 100 in a flash LIDAR application in accordance with some embodiments described herein. The system 100 includes a control circuit 105, a timing circuit 106, an emitter array 115 including a plurality of emitters 115e, and a detector array 110 including a plurality of detectors 110d. The detectors 110d include time-of-flight sensors (for example, an array of single-photon detectors, such as SPADs). The system 100 may also include image sensors (for example, an array of CIS) integrated in and/or separate from the detector array 110, and configured to output signals representing images of the FoV 190. One or more of the emitter elements 115e of the emitter array 115 may define emitter units that respectively emit a radiation pulse or continuous wave signal (for example, through a diffuser or optical filter 114) at a time and frequency controlled by a timing generator or driver circuit 116. In particular embodiments, the emitters 115e may be pulsed light sources, such as LEDs or lasers (such as vertical cavity surface emitting lasers (VCSELs)). Radiation is reflected back from a target 150, and is sensed by detector pixels defined by one or more detector elements 110d of the detector array 110. The control circuit 105 implements a pixel processor that measures and/or calculates the time of flight of the illumination pulse over the journey from emitter array 115 to target 150 and back to the detectors 110d of the detector array 110, using direct or indirect ToF measurement techniques. The system 100 can be coupled to a vehicle such that the emitter elements 115e and detector elements 110d are oriented relative to an intended direction of travel of the vehicle.

In some embodiments, an emitter module or circuit 115 may include an array of emitter elements 115e (e.g., VCSELs), a corresponding array of optical elements 113,114 coupled to one or more of the emitter elements (e.g., lens(es) 113 (such as microlenses) and/or diffusers 114), and/or driver electronics 116. The optical elements 113, 114 may be optional, and can be configured to provide a sufficiently low beam divergence of the light output from the emitter elements 115e so as to ensure that fields of illumination of either individual or groups of emitter elements 115e do not significantly overlap, and yet provide a sufficiently large beam divergence of the light output from the emitter elements 115e to provide eye safety to observers.

The driver electronics 116 may each correspond to one or more emitter elements, and may each be operated responsive to timing control signals with reference to a master clock and/or power control signals that control the peak power of the light output by the emitter elements 115e. In some embodiments, each of the emitter elements 115e in the emitter array 115 is connected to and controlled by a respective driver circuit 116. In other embodiments, respective groups of emitter elements 115e in the emitter array 115 (e.g., emitter elements 115e in spatial proximity to each other), may be connected to a same driver circuit 116. The driver circuit or circuitry 116 may include one or more driver transistors configured to control the frequency, timing and amplitude of the optical emission signals that are output from the emitters 115e. The emission of optical signals from multiple emitters 115e provides a single image frame for a flash LIDAR system 100. The maximum optical power output of the emitters 115e may be selected to generate a signal-to-noise ratio of the echo signal from the farthest, least reflective target at the brightest background illumination conditions that can be detected in accordance with embodiments described herein. An optional filter to control the emitted wavelengths of light and diffuser 114 to increase a field of illumination of the emitter array 115 are illustrated by way of example.

Light emission output from one or more of the emitters 115e impinges on and is reflected by one or more targets 150, and the reflected light is detected as an optical signal (also referred to herein as a return signal, echo signal, or echo) by one or more of the detectors 110d (e.g., via receiver optics 112), converted into an electrical signal representation (referred to herein as a detection signal), and processed (e.g., based on time of flight) to define a 3-D point cloud representation 170 of the field of view 190. Operations of lidar systems in accordance with embodiments of the present disclosure as described herein may be performed by one or more processors or controllers, such as the control circuit 105 of FIG. 1.

In some embodiments, a receiver/detector module or circuit 110 includes an array of detector pixels (with each detector pixel including one or more detectors 110d), receiver optics 112 (e.g., one or more lenses to collect light over the FoV 190), and receiver electronics (including timing circuit 106) that are configured to power, enable, and disable all or parts of the detector array 110 and to provide timing signals thereto. The detector pixels can be activated or deactivated with at least nanosecond precision, and may be individually addressable, addressable by group, and/or globally addressable. The sensitivity of each of the detectors 110d or of groups of detectors may be controlled. For example, when the detector elements include reverse-biased photodiodes, avalanche photodiodes (APD), PIN diodes, and/or Geiger-mode Avalanche Diodes (SPADs), the reverse bias may be adjusted, whereby, the higher the overbias, the higher the sensitivity.

The receiver optics 112 may include a macro lens that is configured to collect light from the largest FoV that can be imaged by the lidar system, microlenses to improve the collection efficiency of the detecting pixels, and/or anti-reflective coating to reduce or prevent detection of stray light. In some embodiments, a spectral filter 111 may be provided to pass or allow passage of 'signal' light (i.e., light of wavelengths corresponding to those of the optical signals output from the emitters) but substantially reject or prevent passage of non-signal light (i.e., light of wavelengths different than the optical signals output from the emitters).

In some embodiments, a control circuit 105, such as a microcontroller or microprocessor, provides different emitter control signals to the driver circuitry 116 of different emitters 115e and/or provides different signals to the timing circuitry 106 of different detectors 110d to enable/disable the different detectors 110d so as to detect the echo signal from the target 150. The timing signals may define the frequency of operation of the detector(s) 110d, also referred to herein as the measurement frequency. The measurement frequency (or frequencies) of the detectors 110d may thus be based on the operating frequency (or frequencies) of the emitters 115e (e.g., the pulse repetition rate where the emission signal is a square wave or pulsed signal). The control circuit 105 may also control memory storage operations for storing data indicated by the detection signals in a non-transitory memory or memory array.

The control circuit 105 may represent one or more control circuits, for example, an emitter control circuit that is configured to provide the emitter control signals to the emitter array 115 and/or a detector control circuit that is configured to provide the detector control signals to the detector array 110 as described herein. Also, the control circuit 105 may include a sequencer circuit that is configured to coordinate operation of the emitters 115e and detectors 110d. More generally, the control circuit 105 may include one or more circuits that are configured to generate the respective control signals that control the timing and/or durations of activation of the detectors 110d, and/or to that control the output of optical signals from the emitters 115e (also referred to herein as optical emission signals).

Some embodiments of the present disclosure are directed to indirect ToF systems, which may provide higher frame rates (e.g., due to lower raw data rates and a lower computational overhead) as compared to some direct ToF systems. Some iToF lidar systems operate by transmitting (from one or more emitters, e.g., defining an emitter unit), receiving (at one or more detectors, e.g., defining a detector pixel), and measuring (at one or more controllers/processors) the phase of optical signals at multiple (e.g., two) different measurement frequencies (e.g., with respect to emitter operation) and/or acquisition integration times (e.g., with respect to detector operation). For example, the emitters 115e of the lidar system 100 may emit a continuous modulated sinusoidal or square wave (i.e., pulsed) light signal at each of the multiple frequencies, and the phase shift of the echo signals received at the detectors 110d or detector pixels (that is, the phase difference between the emission signal and received echo signals) may be measured or calculated by the control circuit 105 based on the detection signals output from the detectors 110d. In some examples described herein, the emitters 115e emit optical signals as bursts of pulsed light (also referred as pulses), with each burst having a respective repetition rate/frequency and pulse width, with burst duration (e.g., in terms of number or cycles of pulses per burst) equal to or defining an acquisition or subframe of detector operation.

In some embodiments, phase data may be acquired by operating the emitters 115e phase-locked to a clock signal (e.g., a global clock signal) and operating the detector array 110 phase-locked to the emitter pulses, so as to integrate the echo signals at acquisition windows which are offset (e.g., relative to the global clock signal) by respective phase delays (e.g., zero, one-quarter, one-half, and three-quarters phase delays) of the emitter pulse cycle or frequency, also referred to herein as respective phase offsets. In other embodiments, phase data may be acquired by operating the detector array 110 phase-locked to a clock signal (e.g., a global clock signal) so as to integrate the echo signals at fixed acquisition windows, and operating the emitters 115e to emit optical signals in bursts of pulses that are offset (e.g., relative to the global clock signal) by the respective phase delays of the emitter pulse cycle or frequency. Each acquisition of multiple emitter pulse cycles in a burst corresponding to a respective phase delay or phase offset generates or defines a subframe.

For wide FoVs and high dynamic range lighting conditions, iToF systems may require collection of more subframes to accurately perform ranging measurements. In some embodiments, the detector acquisitions or subframes for the respective phase delays or phase offsets may include more emitter pulse cycles per burst (defining subframes with longer acquisition integration times), or fewer emitter pulse cycles per (defining subframes with shorter acquisition integration times). For example, the longer acquisition integration times (with more emitter pulses per burst at each phase offset) may improve detection of farther/less-reflective targets, while the shorter acquisition integration times (with fewer emitter pulses per burst at each phase offset) may reduce or avoid detector saturation in detection of nearer/more-reflective targets, thereby increasing the dynamic range of the system.

Following the acquisition and integration of all echo signals from a given burst of pulses and at a specific phase delay with respect to the emitter pulse cycle, a subframe signal including phase component data is generated for each detector pixel. The phases may be measured with a series of separate component measurements at the respective phase offsets, which correspond to "subframes" or sub-measurements of operation of the detector pixels. Embodiments are described by way of example herein with reference to four (0, 90, 180, and 270 degree (°)) component measurements or phase subframes, which collectively generate or define a frame of operation of the detector pixels for a respective measurement frequency and/or acquisition integration time. In some embodiments, component measurements at the respective phase offsets may be generated for each of a plurality of different measurement frequencies and/or each of a plurality of different acquisition integration times (e.g., four phase subframes with shorter acquisition integration times at each of two measurement frequencies, and four phase subframes with longer acquisition integration times at each of the two measurement frequencies). In some instances, the frame includes a fifth subframe (e.g., for background intensity detection and/or subtraction at a time when no echo signals are present) is also acquired in order to improve the fidelity of the reported 3D image. The results of these component measurements produce multiple (e.g., two) vector components (e.g., an X-component based on the 0° and 180° subframes, and a Y-component based on the 90° and 270° subframes), and the angle formed by these vector components is the vector phase.

The phases (as determined for the respective measurement frequencies and/or acquisition integration times) may each be related to the distance of the object contained in or imaged by the pixel, though they may change at different rates. However, the associated wavelengths of the measurement frequencies are typically shorter than the read range or imaging range, so the combination of two phases, one at each measurement frequency, can be used to uniquely identify the distance. That is, distance may be determined by analyzing respective signals at multiple (e.g., two) separate or distinct modulation or measurement frequencies and/or acquisition integration times, where each measurement frequency has a different unambiguous range, such that the true or actual location of the target may be indicated where the measurements at the different measurement frequencies agree or match. The phase delay of the returning light signal (after reflection by a target in the field of view) may be converted to distance using lookup tables (which correlate respective phase shift pairs to respective distance sub-ranges of an unambiguous range for two or more measurement frequencies), and/or using quadrature sampling techniques as described herein.

Figure 2:
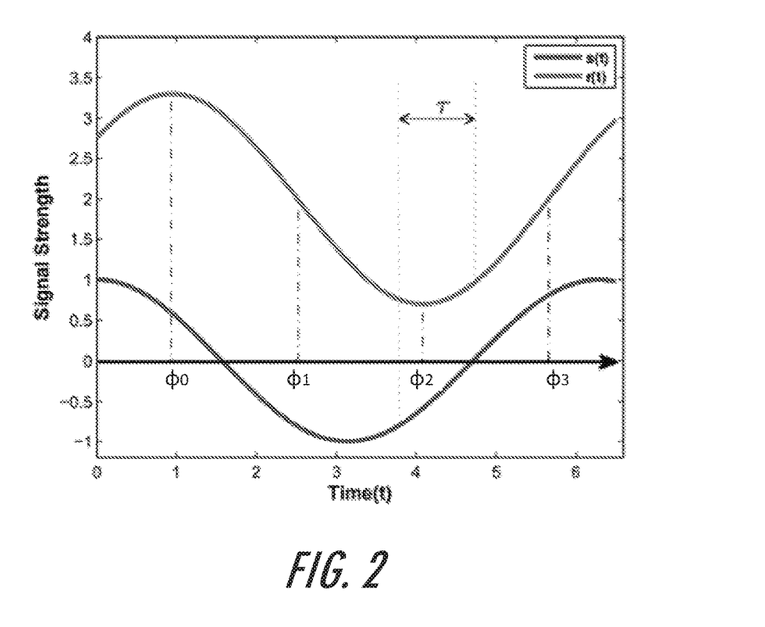
FIG. 2 is a graph illustrating an example calculation of phase delay in accordance with some embodiments of the present disclosure.

FIG. 2 is a graph illustrating an example calculation of phase delay in accordance with some embodiments of the present disclosure. The operations and equations discussed herein may be performed or calculated by a controller or processor, such as the control circuit 105 of FIG. 1. For example, for an optical emission signal with a modulation frequency of $f_m$, the sent signal s(t) (i.e., the optical signal output from one or more emitters 115e) and the received signal r(t) (i.e., the echo signal incident on one or more detectors 110d) as a function of time t with delay τ may be given by:

$$s(t) = a \cos(2\pi f_m t) \quad (1)$$

$$r(t) = A \cos(2\pi f_m (t-\tau)) + B \quad (2)$$

where A and B are the unknown scale and offset of the reflected signal, respectively. For example, A is the amplitude of the received signal r(t) and may depend on the target's reflectivity and/or the detector's sensitivity. B may be due to ambient illumination associated with the operating environment. These parameters may be estimated at the emitter and/or control circuit. The cross-correlation for s(t) and r(t) may be:

$$c(\varphi) = \lim_{T \to \infty} \int_{-\frac{T}{2}}^{\frac{T}{2}} r(t)s(t+\varphi)dt = \frac{aA}{2}\cos(2\pi f_m \varphi + 2\pi f_m \tau) + B \quad (3)$$

In Equation 3, amplitude A, offset B, and delay τ may be unknown. These variables can be solved by a four-component method described, for example, by R. P. Horaud, "Tutorial on 3D Sensors, April 2013." In the four-component method, four equidistant samples (also referred to herein as four phase subframes) may be captured at locations (φ0, φ1, φ2, φ3; also referred to herein as component measurements D0, D1, D2, D3) within a modulation cycle as illustrated in the graph of FIG. 2.

The cross correlations of these four outputs with the source signal s(t) can be denoted by c(φ0), c(φ1), c(φ2), c(φ3). The three unknown variables can be calculated based on these correlations The amplitude A can be calculated as:

$$A = \frac{\sqrt{[c(\varphi 3) - c(\varphi 1)]^2 + [c(\varphi 0) - c(\varphi 2)]^2}}{2}. \quad (4)$$

The offset B may be attributed to background illumination and can be calculated as:

$$B = \frac{c(\varphi 0) + c(\varphi 1) + c(\varphi 2) + c(\varphi 3)}{4}. \quad (5)$$

The delay τ is the time of flight for light sent from the emitter, reflected from the target's surface, and received by the ToF detector and can be calculated as:

$$\tau = \arctan\left[\frac{c(\varphi 3) - c(\varphi 1)}{c(\varphi 0) - c(\varphi 2)}\right] \quad (6)$$

The value of τ is proportional to the range or distance d between the ToF system and the illuminated target as τ=2d/c, where c is the speed of light. Then the delayed phase between s(t) and r(t) can be denoted as φ=2πf_m τ=2πf_m (2 d/c). Since φ ranges from (0, 2π], the measured distance d reaches its maximum unambiguous range UR when φ=2π.

As noted, above a matching reported range for two or more different measurement frequencies may indicate the actual range. For square wave or pulsed optical emission signals, the measurement frequency may refer to the pulse repetition rate, for example, for a burst of pulses. In some embodiments, combinations of multiple measurement frequencies may be used to increase the unambiguous range. For example, some systems may use two measurement frequencies (e.g., 18 MHz and 21 MHz), where a difference between the measurement frequencies (e.g., 3 MHz) defines the unambiguous range of the system. As mentioned, the unambiguous range UR may be defined as $c/2f_m$, so for a frequency difference $f_m$=3 MHz, UR=$c/2f_m$=3×10$^8$/2(3,000, 000)=50 m. The measurement frequencies may be selected such that they are integer multiples of the frequency defining the unambiguous range.

In the example system 100 of FIG. 1, the control circuit 105 may include a pixel processor that outputs emitter control signals and detector control signals to the emitter array 115 and detector array 110 to control the emission of the optical signals and the detection of the reflective optical signals, respectively. The control circuit 105 calculates the distance to the target 150 by measuring the phase delay or phase shift of an illumination pulse (or the aggregate of multiple illumination pulses) over the journey from the emitter array 115 to a target 150 and back to the detector array 110 (i.e., the difference in phase between the optical signal emitted by the emitter array 115 and the reflected optical signal or echo received at the detector array 110, as indicated by the respective detection signals output from the detector array 110). Portions or an entirety of the control circuits described herein may be integrated in the emitter array 115 and/or detector array 110 in some embodiments. Although illustrated with reference to a flash LIDAR system, it will be understood that embodiments described herein may include non-flash or scanning (also referred to as "line scanning" or "point scanning" without loss of generality to other types of scanning) LIDAR systems as well.

In some embodiments, for each of the measurement frequencies of the optical signals output by the emitter array 115, the control circuit 105 may perform a phase measurement that is based on multiple component measurements (referred to herein with reference to four phase vector component measurements, D0, D1, D2, D3) indicative of the different phases of the detection signals output from the detector array 110. The respective phase vector component measurements D0, D1, D2, and D3 may be considered as samples of the returning echo signals that are taken at respective phase offsets (e.g., at 0°, 90°, 180°, and 270° phase delays) with respect to a chip reference signal for the detector array 110. It will be understood that the description herein with reference to four measurements, D0, D1, D2, and D3 with phase offsets of 0°, 90°, 180°, and 270° is by way of example only, and that embodiments of the present disclosure may utilize fewer or more component measurements at these or other phase offsets for distance or range calculation.

More particularly, each of the detector elements 110d of the detector array 110 is connected to a timing circuit 106. The timing circuit 106 may be phase-locked to the driver circuitry 116 of the emitter array 115. The timing of operation and sensitivity of each of the detector elements 110d or of groups of detector elements 110d may be controlled by the timing circuit 106. The timing circuit 106 may operate respective detector pixels (including one or more detector elements 110d) of the detector array 110 to sample the echo signals at respective phase offsets (e.g., 90°, 180°, 270°) corresponding to the respective phase measurement subframes. As such, each of the detection signals output from the detector array 110 may be indicative of a phase measurement including multiple phase vector component measurements D0, D1, D2, D3 sampled at phase offsets 0°, 90°, 180°, 270°, respectively, for a respective measurement frequency $f_m$, where the component measurements determined from each detection signal define a respective phase vector.

In some embodiments, a detector element 110d or detector pixel of a detector array 110 may include first and second accumulator wells, with each well being alternately activated by the control circuit 105 or associated timing circuit 106 based on the measurement frequency $f_m$ to detect incident photons for respective portions (or subframes) of each phase measurement (or frame). In some embodiments, operation of the emitter elements 115 may be based on a global clock signal, with operation of the accumulator wells of the detector pixels being offset at respective phase delays or phase offsets relative to the global clock signal In some embodiments, operation of the accumulator wells of the detector pixels may be based on the global clock signals, with operation of the emitters 115 being offset at respective phase delays or phase offsets relative to the global clock signal.

Each subframe may represent the aggregated returns (e.g., the integrated intensity $c(\varphi)$ of the detected charges) over multiple (e.g., tens or hundreds or thousands) pulses of the optical signals output by the emitters 115e, and may be delayed or "shifted" (relative to one another) based on a fraction (e.g., ¼) of the period defined by the respective measurement frequency $f_m$ (where the period=$1/f_m$). For example, in measurement of the 0 degree subframe, the accumulator wells may be activated to collect data for the period corresponding to the measurement frequency for tens or hundreds or thousands of cycles of the optical signals, with similar operation of the detector(s) being shifted in time by one-quarter of the period corresponding to the measurement frequency for each of the remaining 90, 180, and 270 degree subframes.

For instance, for an optical signal emitted from the emitter array 115 at a measurement frequency of 20 MHz (and thus, a period of 50 nanoseconds (ns)), measurement of the 0° subframe may include activation of a first accumulator well of a detector 110d for time range of 0 ns to 25 ns (e.g., half of the 50 ns period), and activation of a second accumulator well of the detector 110d for time range 25 ns to 50 ns (e.g., the other half of the 50 ns period), for tens or hundreds or thousands of cycles of the optical signal. The timing of activation of the first and second accumulator wells may each be likewise shifted or offset by 12.5 ns (e.g., one-quarter of the 50 ns period) for measurement of each subsequent subframe (e.g., 90°, 180°, 270°) of a phase measurement. For example lidar systems as described herein using two measurement frequencies, distance may be measured using eight subframes (i.e., four component measurements or phase subframes at each of the two measurement frequencies).

As noted above, a phase measurement for each measurement frequency may be taken by operating the detector array 110 so as to output detection signals from which a series of separate component measurements, which may correspond to subframes of operation of the detectors 110d, may be determined. Each subframe may thus be a measurement of a phase component that is 0, 90, 180, or 270 degrees out of phase (or offset) with respect to a reference optical signal pulse or other reference signal, with operation of the detector(s) 110d being shifted by one-quarter of the period corresponding to the measurement frequency for each of the four subframes. Embodiments herein are described by way of example with reference to a detector phase measurement including four subframes with phase component measurements D0, D1, D2, D3 taken at 0, 90, 180, 270 degree phase delays, respectively, but the present invention is not limited to these examples. The signals D0 and D2 measured in the 0° and 180° subframes are correlated, as are the signals D1 and D3 measured in the 90° and 270° subframes. For example, for a static scene, the signals D0 and D2 measured in the 0° and 180° subframes may be equal and opposite, and the signals D1 and D3 measured in the 90° and 270° subframes may be equal and opposite. In some embodiments, the use of correlated component measurements (e.g., D0 and D2; D1 and D3) may compensate for differences or asymmetries in the electrode structures of the first and second accumulator wells in each detector pixel, with each component measurement indicating a charge difference between the accumulator wells.

Figure 3:
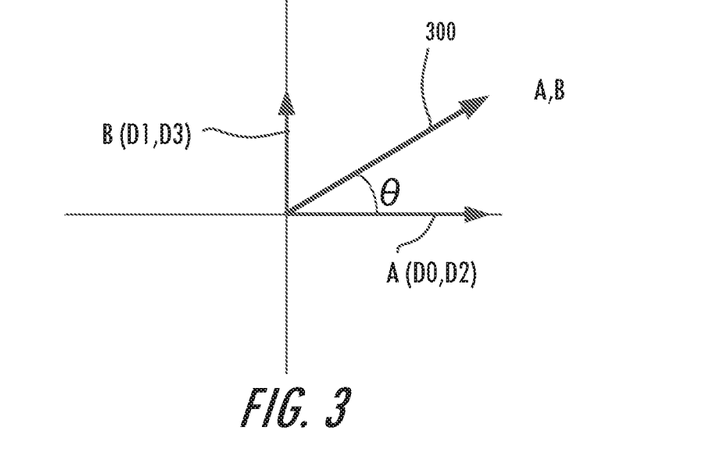
FIGS. 3, 4A, and 4B are diagrams illustrating operations for estimating velocity based on calculation of intermediate vectors in in phase space in accordance with embodiments of the present disclosure.

Referring to the diagram of FIG. 3, the phase component measurements from each detection signal represent multiple (e.g., two orthogonal) vector components A, B defining a phase vector 300. In rectangular form, the data D0 and D2 measured in the 0° and 180° subframes define horizontal (or X-) components of the vector 300, and can be combined (e.g., by vector addition) in a single data channel A. The data D1 and D3 measured in the 90° and 270° subframes define vertical (or Y-) components of the vector 300, and can be likewise combined in a single data channel B. In other words, the first vector component A (e.g., from the 0° and 180° subframe measurements) may represent a horizontal/X-component, and the second vector component B (e.g., from the 90° and 270° subframe measurements) may represent a vertical/Y-component. The vector phase of a received detection signal for each measurement frequency (and/or acquisition integration time) may be the angle θ defined by the vector A,B represented by the component measurements. That is, the two pairs of phase component measurements (the 0°, 180° components D0, D2 and the 90°, 270° components D1, D3) for a measurement frequency may be combined into horizontal (X-) and vertical (Y-) components, respectively, of a phase vector 300 for that measurement frequency, with the angle θ formed by these components being the vector phase.

Operations of LIDAR systems described herein may arise from recognition that, when an object or other target is moving towards or away from the detector(s) or detector array of (also referred to herein as a camera) of the LIDAR system, the actual phase vector (indicating the motion of the object/target) may change from one subframe to the next subframe. The phase measurement of the return signal based on multiple (e.g., four) subframes may thus not accurately indicate the distance of a moving object. This may be particularly problematic for objects moving toward the camera, because when the speed of an incoming or approaching object is too great (e.g., about 1 meter/full frame), ranges may be misread or otherwise miscalculated. For example, at speeds associated with automotive applications, the distance or range of an approaching automobile may be miscalculated on the order of meters. That is, some existing methods for calculating the distance of an object based on the detected phase shift of the returning echo signal at multiple measurement frequencies may be inaccurate when the object is in motion, and the inaccuracy may be unacceptably high in some applications.

Figure 4A:
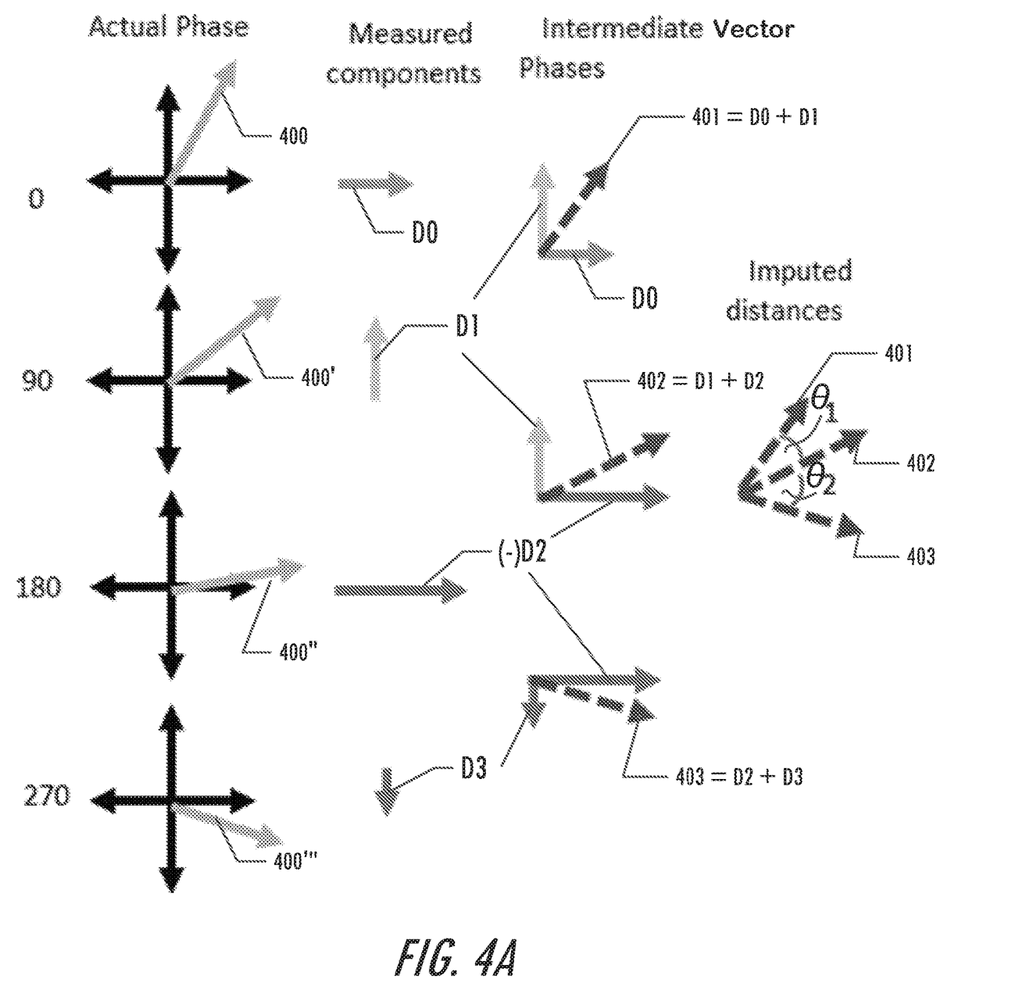
Figure 4B:
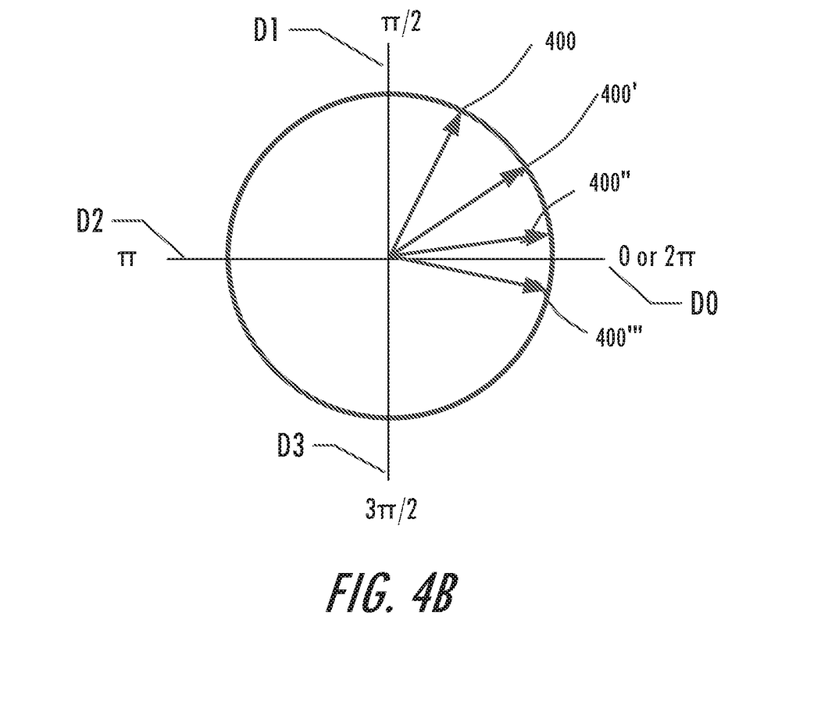
Figure 5:
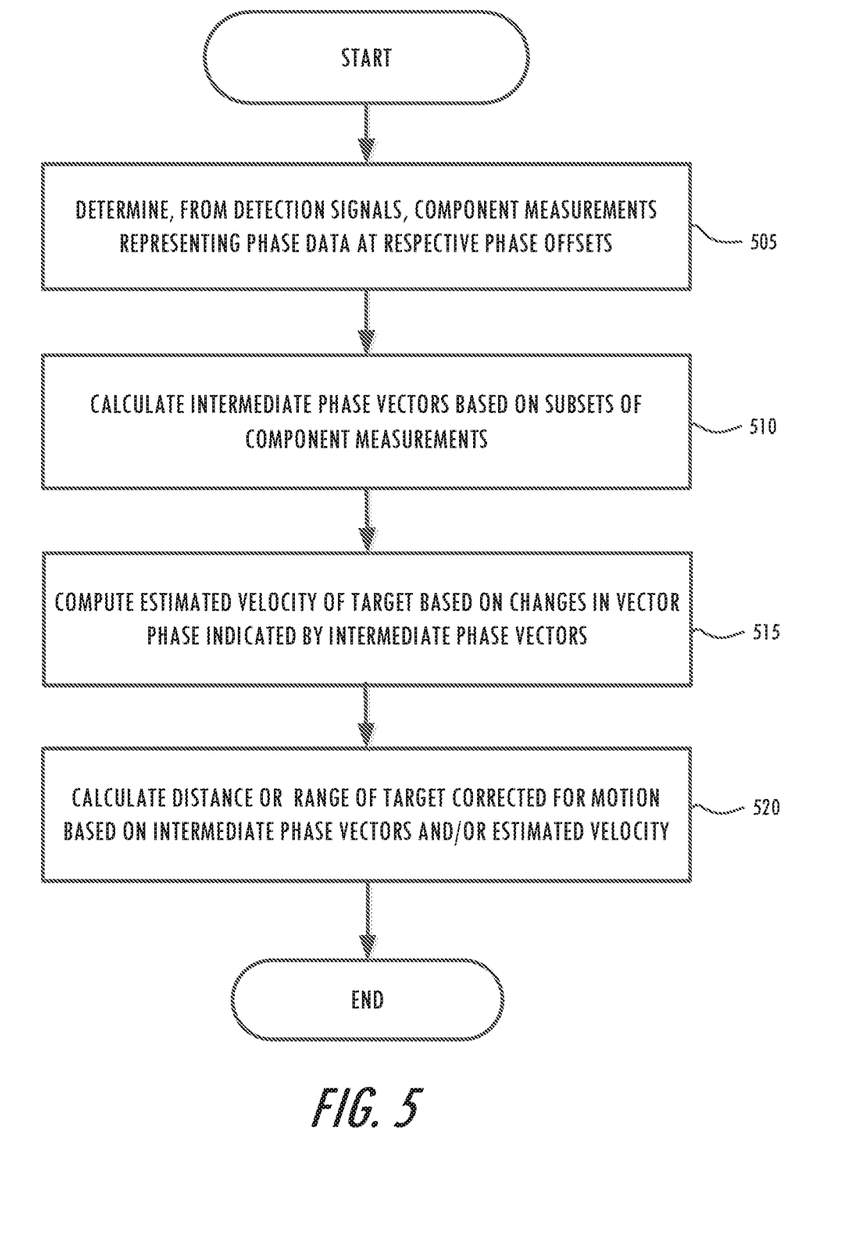
FIG. 5 is a flowchart illustrating operations for calculating a distance or range that is corrected for motion of a target in accordance with embodiments of the present disclosure.

Some embodiments described herein may address these and other problems by employing circuits or systems that correct or improve distance or range measurements for the motion of an object or other target based on calculation of intermediate phase vectors from the detection signals output from the detector pixels for each measurement frequency and/or acquisition integration time. The intermediate phase vectors indicate changes in the phase vector between component measurements or subframes (e.g., consecutive component measurements or subframes) corresponding to respective phase offsets of the emission pulse frequency. FIGS. 4A and 4B are diagrams illustrating example calculation of intermediate phase vectors in phase space in accordance with embodiments of the present disclosure. FIG. 5 is a flowchart illustrating example operations for estimating speed of a target based on calculation of intermediate phase vectors in accordance with embodiments of the present disclosure. The operations of FIGS. 4 and 5 may be performed by a processor or control circuit, such as the control circuit 105 of FIG. 1.

Referring to FIGS. 4A and 5, component measurements representing phase data for an object or target (from which optical emission signals from one or more emitters 115e were reflected) are determined from detection signals output by one or more detector pixels of the detector array 110 (block 505). The phase data may be vector data representing a phase shift (relative to the timing of the emission signals and/or a chip reference signal for the detector array 110), and may be represented by the component measurements in each detection signal. As shown in FIG. 4A, the actual phase of a detection signal can be defined by multiple phase vector component measurements D0, D1, D2, D3, but the actual phase may change (shown by phase vectors 400, 400', 400", and 400'") between component measurements or subframes. As such, the phase vector component measurements D0, D1, D2, D3 represent samples of the phase vectors 400, 400', 400", and 400'" at phase offsets 0°, 90°, 180°, and 270° corresponding to respective subframes of operation of the detectors, as shown in FIG. 4B. The example of FIGS. 4A and 4B is described with reference to the eight subframes (four component measurements/subframes at each of two measurement frequencies), but it will be understood that embodiments of the present disclosure may include fewer or more subframes and/or measurement frequencies.

Still Referring to FIGS. 4A and 5, the control circuit 105 calculates intermediate phase vectors 401, 402, 403 based on subsets of the component measurements D0, D1, D2, D3 (block 510). In particular, from the four phase vector component measurements D0, D1, D2, D3 for each measurement frequency, three quantities (referred to herein as intermediate phase vectors) may be computed: (i) a first intermediate phase vector 401 from the data captured in the 0° and 90° subframes; (ii) a second intermediate phase vector 402 from the data captured in the 90° and (the negative of the) 180° subframes; and (iii) a third intermediate phase vector 403 from the data captured in the 180° and 270° subframes.

The first intermediate phase vector 401 may represent the X-component D0 of the phase measured (integrated over multiple cycles of the optical emission signals) at the 0 degree subframe and the Y-component D1 of the (changed) phase at the 90 degree subframe (due to movement of the target between the time of measurement of the 0 degree subframe and the 90 degree subframe. The second intermediate phase vector 402 may represent the Y-component D1 of the phase at the 90 degree subframe and the X-component D2 of the (changed) phase at the 180 degree subframe (due to movement of the target between the time of measurement of the 90 degree subframe and the 180 degree subframe). The third intermediate phase vector 403 may represent the X-component D2 of the phase at the 180 degree subframe and the Y-component D3 of the (changed) phase at the 270 degree subframe (due to movement of the target between the time of measurement of the 180 degree subframe and the 270 degree subframe).

The intermediate phase vectors 401, 402, 403 represent the approximate phase change between pairs of consecutive subframes (e.g., between the 0° and 90° subframes, the 90° and 180° subframes, and the 180° and 270° subframes) of a phase measurement (where each subframe of the phase measurement represents the aggregated measurements from multiple pulses of the optical emission signals), and may be calculated for each measurement frequency. The change in vector phase between subframes indicated by the intermediate phase vectors may be proportional to the change in distance of the target between subframes. The intermediate phase vectors 401, 402, 403 may thus be indicative of movement of the target between subframes.

In greater detail, respective vector phases indicated by $\theta_1$ (the angle defined between intermediate phase vectors 401 and 402) and $\theta_2$ (the angle defined between intermediate phase vectors 402 and 403) may be calculated from the intermediate phase vectors 401, 402 403. The vector phases $\theta_1$ and $\theta_2$ represent motion of the target between consecutive subframes, and thus respective distances may be indicated by and/or otherwise determined from the respective vector phases $\theta_1$ and $\theta_2$. As the durations of time of each subframe (e.g., based on a predetermined number of optical signal pulse returns per subframe) and the times between consecutive subframes are known, the control circuit 105 computes an estimated speed (a scalar quantity based on the distance over the known time) and/or velocity (a vector quantity based on both the indicated magnitude and vector directions) based on the changes in vector phase indicated by the intermediate phase vectors 401, 402, 403 (block 515). In particular, a radial velocity indicating the relative rate of change in the position of the object/target with respect to the lidar system may be computed. That is, several sets of vector phases (e.g., $\theta_1$ and $\theta_2$ for each of multiple measurement frequencies) may be collected and the differences in vector phase over time may be used to estimate the radial velocity.

For example, for a static target, the three intermediate phase vectors 401, 402, and 403 may be roughly equal, and there would thus be no change in the respective distances over the corresponding time durations (that is, $\theta_1=0$; $\theta_2=0$; within some amount of noise). For a target that is moving at a constant speed between subframes, the difference in vector phase (indicated by the angle $\theta_1$) between the first and second intermediate phase vectors 401 and 402, and the difference in phase (indicated by the angle $\theta_2$) between the second and third intermediate phase vectors 402 and 403 may be roughly equal (that is, $\theta_1=\theta_2$). The value of the difference (in magnitude and vector phase) between the first and second intermediate phase vectors 401 and 402 indicates the respective vector phase change or movement of the target in the subframe to subframe time duration (e.g., between consecutive subframes). Likewise, the value of the difference between the second and third intermediate phase vectors 402 and 403 indicates the respective vector phase change or movement of the target in the subframe to subframe time duration (e.g., between consecutive subframes).

That is, the changes (in vector phase and/or magnitude) indicated by the two intermediate vector pairs (401, 402 and 402, 403) represents a distance (moved by the object between subframes), and the times of or between the subframes are known, such that the control circuit 105 can calculate the estimated radial velocity. In the above example, two vector phase differences $\theta_1$ and $\theta_2$ are calculated (based on two intermediate vector pairs) for each of the two measurement frequencies (e.g., 18 MHz and 21 MHz) and/or acquisition integration times. More generally, the velocity calculation may result from multiple sets of redundant information (e.g., four sets of redundant information, based on the two vector phase differences $\theta_1$ and $\theta_2$ for the two measurement frequencies). For a constantly moving target, the two vector phase differences $\theta_1$ and $\theta_2$ (and thus, the two distances indicated thereby) for each measurement frequency may be equal, indicating a constant rate of change in distance between subframes. For an accelerating target, the two vector phase differences $\theta_1$ and $\theta_2$ (and indicated distances) for each measurement frequency may be different, indicating a varying rate of change in distance between subframes.

Thus, embodiments described herein can perform computations to estimate the speed of an object, in some embodiments within a single phase measurement or frame (i.e., based on the set of component measurements for one cycle of phase offsets). In some embodiments, for each measurement frequency, a plurality of component measurements (e.g., four component measurements) are performed, subsets of which are used to calculate intermediate phase vectors (e.g., three intermediate phase vectors), and a difference (e.g., an angular difference $\theta$) between pairs of the intermediate phase vectors may be calculated to indicate a subset of (e.g., two) distances, a comparison of which may indicate an actual speed of an object with respect to the lidar system. It will be understood that, as described herein, speed or velocity may refer to radial velocity relative to the detector(s) of a lidar system (or a vehicle on which the lidar system is mounted), that is, a relative rate of change in distance between the object/target and the lidar system. Embodiments of the present disclosure may thus address deficiencies of some iToF systems, such as long integration times and thus susceptibility to errors, which may result from the relative motion between the lidar system and the object/target.

Still referring to FIG. 5, the control circuit may correct or otherwise adjust calculation of a distance or range of the target for motion based on the intermediate phase vectors and/or the estimated velocity (block 520). For example, based on the estimated velocity and the known time duration(s) of or between subframes, one or more distances can be computed and used to adjust the distance calculation for the motion of the target between subframes. In some embodiments, multiple sets of subframes may be measured over different integration times (that is, based on a different number of pulses of the optical emission signal), e.g. to increase dynamic range. Based on the estimated velocity calculated for the respective integration times and the known time durations, respective distances can be computed to account for the motion of the target.

Additionally or alternatively, respective dwell times of the target at subsets of the detector array may be determined by the control circuit 105 and used to correct the estimated distance range of the object or target for motion (block 520). As used herein, dwell times may refer to durations of time for which a target is imaged by respective detector pixels, e.g., in a detector array where each detector pixel is arranged or otherwise positioned to image a respective portion (for example, one degree) of the FoV. A target that is moving may be imaged by (and thus may have different dwell times at) different detector pixels at different times, in some embodiments for different portions of a subframe. Once it is determined that portions of an object or target are present at portions of the FoV imaged by different pixels at different times, this information can be used to correct the distance calculation, independently of or in combination with the estimated velocity. For example, the control circuit 105 may apply phase corrections to the estimated velocity and/or to phase data represented by the component measurements determined from the detection signals output from the respective detector pixels based on the corresponding dwell times.

For example, in a detector array including four detector pixels 1, 2, 3, and 4, the object may be imaged by or dwell 75% of subframe 1 in detector pixel 1 and 25% of subframe 1 in detector pixel 2; then 50% of subframe 2 in detector pixel 2 and 50% of subframe 2 equally split between pixels 3 and 4; and 100% of subframes 3 and 4 in pixel 5. Then for purposes of range measurements, the subframe 1 signals from pixel 1 and 2 are weighted by 75% and 25% and added to form the phase 1 signal (e.g., component measurement D0); the signals from pixels 2, 3 and 4 are weighted by 50%, 25% and 25% respectively, and added to generate the phase 2 signal (e.g., component measurement D1), the signals from pixel 5 are weighted by 100% to generate each of the phase 3 and 4 signals (e.g., component measurements D2 and D3, respectively).

In some embodiments, the control circuit 105 is configured to determine the respective dwell times based on identification of the target from signals received from pixel elements of an image sensor-based camera. Image sensor pixel elements may collect data indicative of visible features of one or more targets (including color, size, points, lines, etc.; also referred to herein as image information or an RGB image) in the field of view with higher resolution than some ToF detector pixels, which may collect data indicative of "depth" information over the field of view. The control circuit 105 and/or other processing units can combine or merge the data from the various sensors to spatially and temporally correlate the image information with the depth information (also referred to herein as image registration).

In particular, an image sensor camera (e.g., an image-sensor-based array of pixel elements which measure the intensity of light from each angle with respect to the lidar detector pixels) may be configured to image a FoV that is spatially co-registered with the FoV of the detectors 110d, such that each pixel in the image sensor camera can be mapped to one or more lidar detector pixels. Temporal co-registration (e.g., via timestamp data) allows this mapping to be concurrent or correlated to each subframe of operation of the lidar detector pixels. For example, the spatial and/or temporal co-registration of the pixel elements of the image sensor camera and the lidar detector pixels may be implemented using shared optics to acquire information for both the image sensor pixels and lidar detector pixels and/or integration of image sensor pixels and lidar detector pixels in a common array, as described in U.S. Patent Application Publication No. 2020/0057151 to Finkelstein et al., the disclosure of which is incorporated by reference herein.

In some embodiments, a processing unit (such as the control circuit 105) identifies and/or classifies objects (e.g., based on visible features indicated by image frames captured by the image sensor camera over the FoV) and maps the objects/features onto temporally-corresponding subframes captured by spatially-corresponding lidar detector pixels. In some embodiments, the processing unit calculates the motion of each mapped object and can thus determine which lidar detector pixel (of the plurality of detector pixels) acquires optical signals reflected from each of the ranged objects in each subframe. In particular, based on the consecutive images from the image sensor camera and the spatially-correlated lidar detector pixels, the processing unit may be configured to determine a dwell time of the object at respective detector pixels of the lidar detector array. The processing unit then calculates the phase shift and thus the range of each object by utilizing the temporally-correlated information from the corresponding lidar detector pixels which were determined as imaging that object each subframe. In cases where a moving object is imaged for part of one subframe by one detector pixel and in another part of the same subframe by another detector pixel, a weighted average of the calculated intensities is applied to the component measurements from the detection signals based on the respective dwell times at those detector pixels.

In other embodiments, the control circuit 105 is configured to determine the respective dwell times based on intensity data from the detection signals. For example, an intensity image can be generated based on the component measurements from the detector pixels, e.g., from the phase-offset subframes and/or an intensity-specific subframe that is captured once per frame (e.g., as 'background' subframe that is intended to sample light without the presence of the echo signals). A processing unit (such as the control circuit 105) identifies and/or classifies objects in the field of view. An interpolation calculation based on the intensity data from consecutive frames or subframes of operation of the detector pixels can be used to estimate the position of the object in subframe resolution, and phase calculation can be performed as described above, that is, by determining which lidar detector pixel (of the plurality of detector pixels) acquires optical signals reflected from each of the ranged objects in each subframe, and utilizing the information from the corresponding lidar detector pixels which were determined as imaging that object each subframe.

More generally, the distance calculation may be corrected for motion of the target (block 520) based on subsets of the component measurements from the detection signals. The subsets of the component measurements may be indicative of phase data (based on one or more phase-offset component measurements), intensity data (e.g., based on one or more intensity-specific component measurements), and/or time-stamp data (e.g., for registration with pixel elements of an image sensor camera).

While described herein by way of specific examples with reference to two modulation/measurement frequencies, it will be understood that embodiments of the present disclosure may utilize fewer or more modulation/measurement frequencies for speed estimation based on intermediate vectors calculated from subsets of component measurements as described herein. For example, in some embodiments a single modulation/measurement frequency may be used, e.g., for systems with shorter range requirements. In other embodiments, more than two modulation/measurement frequencies may be used.

Lidar systems and arrays described herein may be applied to ADAS (Advanced Driver Assistance Systems), autonomous vehicles, UAVs (unmanned aerial vehicles), industrial automation, robotics, biometrics, modeling, augmented and virtual reality, 3D mapping, and security. In some embodiments, the emitter elements of the emitter array may be vertical cavity surface emitting lasers (VCSELs). In some embodiments, the emitter array may include a non-native substrate having thousands of discrete emitter elements electrically connected in series and/or parallel thereon, with the driver circuit implemented by driver transistors integrated on the non-native substrate adjacent respective rows and/or columns of the emitter array, as described for example in U.S. Patent Application Publication No. 2018/0301872 to Burroughs et al., filed Apr. 12, 2018, with the United States Patent and Trademark Office, the disclosure of which is incorporated by reference herein.

Various embodiments have been described herein with reference to the accompanying drawings in which example embodiments are shown. These embodiments may, however, be embodied in different forms and should not be construed as limited to the embodiments set forth herein. Rather, these embodiments are provided so that this disclosure is thorough and complete and fully conveys the inventive concept to those skilled in the art. Various modifications to the example embodiments and the generic principles and features described herein will be readily apparent. In the drawings, the sizes and relative sizes of layers and regions are not shown to scale, and in some instances may be exaggerated for clarity.

The example embodiments are mainly described in terms of particular methods and devices provided in particular implementations. However, the methods and devices may operate effectively in other implementations. Phrases such as "example embodiment", "one embodiment" and "another embodiment" may refer to the same or different embodiments as well as to multiple embodiments. The embodiments will be described with respect to systems and/or devices having certain components. However, the systems and/or devices may include fewer or additional components than those shown, and variations in the arrangement and type of the components may be made without departing from the scope of the inventive concepts. The example embodiments will also be described in the context of particular methods having certain steps or operations. However, the methods and devices may operate effectively for other methods having different and/or additional steps/operations and steps/operations in different orders that are not inconsistent with the example embodiments. Thus, the present inventive concepts are not intended to be limited to the embodiments shown, but are to be accorded the widest scope consistent with the principles and features described herein.

It will be understood that when an element is referred to or illustrated as being "on," "connected," or "coupled" to another element, it can be directly on, connected, or coupled to the other element, or intervening elements may be present. In contrast, when an element is referred to as being "directly on," "directly connected," or "directly coupled" to another element, there are no intervening elements present.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

It will also be understood that the term "and/or" as used herein refers to and encompasses any and all possible combinations of one or more of the associated listed items. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, the regions illustrated in the figures are schematic in nature and their shapes are not intended to illustrate the actual shape of a region of a device and are not intended to limit the scope of the invention.

Unless otherwise defined, all terms used in disclosing embodiments of the invention, including technical and scientific terms, have the same meaning as commonly understood by one of ordinary skill in the art to which this invention belongs, and are not necessarily limited to the specific definitions known at the time of the present invention being described. Accordingly, these terms can include equivalent terms that are created after such time. It will be further understood that terms, such as those defined in commonly used dictionaries, should be interpreted as having a meaning that is consistent with their meaning in the present specification and in the context of the relevant art and will not be interpreted in an idealized or overly formal sense unless expressly so defined herein. All publications, patent applications, patents, and other references mentioned herein are incorporated by reference in their entireties.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments of the present invention described herein, and of the manner and process of making and using them, and shall support claims to any such combination or subcombination.

Although the invention has been described herein with reference to various embodiments, it will be appreciated that further variations and modifications may be made within the scope and spirit of the principles of the invention. Although specific terms are employed, they are used in a generic and descriptive sense only and not for purposes of limitation, the scope of the present invention being set forth in the following claims.

The invention claimed is:

1. A Light Detection And Ranging (LIDAR) apparatus, comprising:
one or more detector pixels configured to output detection signals responsive to optical signals incident thereon over a field of view, the detection signals corresponding to respective phase offsets; and
a circuit configured to determine component measurements of phase vectors corresponding to the respective phase offsets from the detection signals, calculate intermediate phase vectors from subsets of the component measurements, and compute an estimated velocity of a target from which the optical signals were reflected based on changes in vector phase indicated by the intermediate phase vectors.

2. The LIDAR apparatus of claim 1, wherein the circuit is further configured to calculate a distance of the target based on the detection signals, wherein the distance of the target is corrected for motion of the target based on the estimated velocity.

3. The LIDAR apparatus of claim 1, wherein the circuit is configured to calculate the intermediate phase vectors from respective vector sums of the component measurements of the subsets.

4. The LIDAR apparatus of claim 1, wherein the component measurements of each of the subsets correspond to consecutive subframes of operation of the one or more detector pixels, each of the subframes comprising the detection signals corresponding to one of the respective phase offsets.

5. The LIDAR apparatus of claim 4, wherein the subsets collectively define a frame of operation of the one or more detector pixels comprising the consecutive subframes.

6. The LIDAR apparatus of claim 2, wherein the circuit is further configured to determine respective dwell times of the target at the one or more of the detector pixels, wherein the distance of the target is corrected for the motion of the target based on the respective dwell times.

7. The LIDAR apparatus of claim 6, wherein the circuit is configured to determine the respective dwell times based on signals received from an image sensor camera comprising pixel elements that are arranged and operated with spatial and temporal correspondence to the one or more detector pixels relative to the field of view.

8. The LIDAR apparatus of claim 6, wherein the circuit is configured to determine the respective dwell times based on intensity information from the detection signals output from the one or more of the detector pixels.

9. A method of operating a Light Detection And Ranging (LIDAR) apparatus, the method comprising:
performing, by at least one processor, operations comprising:
receiving, from one or more detector pixels, detection signals responsive to optical signals incident thereon over a field of view, the detection signals corresponding to respective phase offsets;
determining component measurements of phase vectors corresponding to the respective phase offsets from the detection signals; and
computing an estimated velocity of a target from which the optical signals were reflected based on subsets of the component measurements,
wherein computing the estimated velocity comprises:
calculating intermediate phase vectors from the component measurements of the subsets; and
computing the estimated velocity based on changes in phase indicated by the intermediate phase vectors.

10. The method of claim 9, wherein the operations further comprise:
calculating a distance of the target based on the detection signals, wherein the distance of the target is corrected for motion of the target based on the estimated velocity.

11. The method of claim 9, wherein the component measurements of each of the subsets correspond to consecutive subframes of operation of the one or more detector pixels, each of the subframes comprising the detection signals corresponding to one of the respective phase offsets.

12. The method of claim 11, wherein the subsets collectively define a frame of operation of the one or more detector pixels comprising the consecutive subframes.

13. The method of claim 10, wherein the operations further comprise:
determining respective dwell times of the target at the one or more of the detector pixels, wherein the distance of the target is corrected for the motion of the target based on the respective dwell times.

14. A flash Light Detection And Ranging (LIDAR) apparatus, comprising:
emitter units configured to emit optical signals over a field of view;
detector pixels configured to output detection signals responsive to light representing the optical signals incident thereon, wherein the detection signals correspond to respective phase offsets; and
a circuit configured to determine component measurements of phase vectors corresponding to the respective phase offsets from the detection signals, calculate intermediate phase vectors from subsets of the component measurements, compute an estimated velocity of a target from which the light was reflected based on the intermediate phase vectors, and calculate a distance of the target based on the detection signals, wherein the distance is corrected for motion of the target based on the estimated velocity.

15. The flash LIDAR apparatus of claim 14, wherein the component measurements of each of the subsets correspond to consecutive subframes of operation of the detector pixels, each of the subframes comprising the detection signals corresponding to one of the respective phase offsets.

16. The flash LIDAR apparatus of claim 15, wherein the subsets collectively define a frame of operation of the detector pixels comprising the consecutive subframes.

17. The flash LIDAR apparatus of claim 14, wherein the circuit is further configured to determine respective dwell times of the target at one or more of the detector pixels, wherein the distance of the target is corrected for the motion of the target based on the respective dwell times.

18. The flash LIDAR apparatus of claim 17, wherein the circuit is configured to determine the respective dwell times based on signals received from an image sensor camera comprising pixels that are arranged and operated with spatial and temporal correspondence to the one or more of the detector pixels relative to the field of view.

19. The flash LIDAR apparatus of claim 17, wherein the circuit is configured to determine the respective dwell times based on intensity information from the detection signals output from the one or more of the detector pixels.

20. The LIDAR apparatus of claim 1, wherein the detection signals are output based on respective measurement frequencies and/or acquisition integration times, and wherein the circuit is configured to compute the estimated velocity based on respective distances indicated by the subsets of the component measurements corresponding to the respective measurement frequencies and/or acquisition integration times.

21. The LIDAR apparatus of claim 1, wherein the LIDAR apparatus is a flash LIDAR apparatus, and wherein the one or more detector pixels comprises a plurality of detector pixels defining a detector array.

22. The LIDAR apparatus of claim 21, wherein the LIDAR apparatus is configured to be coupled to a vehicle such that the detector array is oriented facing an intended direction of travel of the vehicle.

\* \* \* \* \*